US006691034B1

(12) United States Patent
Patera et al.

(10) Patent No.: US 6,691,034 B1
(45) Date of Patent: Feb. 10, 2004

(54) VEHICULAR TRAJECTORY COLLISION AVOIDANCE MANEUVERING METHOD

(75) Inventors: Russell Paul Patera, Torrance, CA (US); Glenn Earl Peterson, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 14 days.

(21) Appl. No.: 10/208,513

(22) Filed: Jul. 30, 2002

(51) Int. Cl.[7] .......... G01S 21/36

(52) U.S. Cl. .......... 701/301; 701/302; 340/436; 340/961; 342/29

(58) Field of Search .......... 701/300, 301, 701/302, 3–4, 14–16, 120–122, 206; 340/903, 945, 961, 963, 435, 436; 342/29, 53, 455, 456; 700/250, 253, 255

(56) References Cited

U.S. PATENT DOCUMENTS 5,058,024 A * 10/1991 Inselberg .......... 701/301
5,566,074 A * 10/1996 Hammer .......... 701/301
5,892,462 A * 4/1999 Tran .......... 701/301
6,049,756 A * 4/2000 Libby .......... 701/301
6,201,482 B1 * 3/2001 Schiefele et al. .......... 701/301
6,408,248 B1 * 6/2002 Yancey et al. .......... 701/301
2003/0055563 A1 * 3/2003 Jonas Lars et al. .......... 701/301

* cited by examiner

*Primary Examiner*—Jacques H. Louis-Jacques
(74) *Attorney, Agent, or Firm*—Derrick Michael Reid

(57) ABSTRACT

A collision prediction and maneuver method determines which ones of many potential target objects have a close conjunction within a gross miss distance with a subject object by trajectory propagation, then determines which one of the conjunctive objects have a high collision probability within a critical miss distance, and then determines an optimum vehicle maneuver to reduce the probability of colliding with another colliding object by determining the maneuver direction, magnitude, and time so that the least amount of propellant is consumed while avoiding potential collisions within miss distance margins. The method includes computational efficiencies in collision probability calculations using trajectory propagations and contour integrations and efficiencies in optimum avoidance maneuvering using gradient and searching computations.

9 Claims, 5 Drawing Sheets

CONTOUR INTEGRATION DIAGRAM

PROBABILITY AND MISS DISTANCE GRAPH

MANEUVER VELOCITY MAGNITUDE GRAPH

LEVEL FLIGHT CONFLICT PROBABILITY GRAPH

DESCENDING FLIGHT CONFLICT PROBABILITY GRAPH

CONFLICT PROBABILITY FOR AIRCRAFT TURN

AIRCRAFT RELATIVE TRAJECTORY GRAPH

AIRCRAFT CONFLICT PROBABIOITY GRAPH

VEHICULAR TRAJECTORY COLLISION AVOIDANCE MANEUVERING METHOD

REFERENCE TO RELATED APPLICATIONS

The present application is related to copending applications entitled, Vehicular Trajectory Collision Conflict Prediction Method, Ser. No. 10/208,140 filed Jul. 30, 2002 having a common inventor.

FIELD OF THE INVENTION

The invention relates to the field of collision prediction and avoidance of airborne and spaceborne moving vehicles. More particularly, the present invention relates to flight path trajectory conflict prediction and maneuvering avoidance methods for airplanes and spacecraft.

BACKGROUND OF THE INVENTION

Aircraft conflict prediction and resolution are performed manually by the pilots and air traffic controllers with the help of automated tools. The increase in air traffic is stressing the ability of the Air Traffic Management System to keep aircraft safely separated. Air traffic growth is expected to continue. The FAA Operation Evolution Plan is aimed at supporting a thirty percent overall growth in commercial aviation operations by 2010. Computer controller aids are expected to help relieve air traffic congestion. Such tools also enable free flight, which saves fuel and time. One such controller aid is the User Request Evaluation Tool, which is a conflict probe that looks ahead twenty minutes and helps en route controllers identify potential conflicts above 18,000 feet. Such tools require efficient computational methods to predict conflict.

Aircraft are usually routed between way points with constant altitude, speed and heading. Heading corrections and throttle adjustments are made to prevent each aircraft from deviating too far off course. Nevertheless, navigation errors, uncertainty in winds and aircraft altitude result in position prediction error. These prediction errors were found to be Gaussian and can be represented by error covariance matrices. Between state vector updates, the error covariance matrices grow. Lateral errors are controlled to about ±1.0 nmi one sigma. Vertical error is roughly ±100 ft one sigma. Along-track errors grow at a rate of about ±15 nautical miles per hour between updates. During climb or decent, position uncertainty increases by an amount that depends on the details of the particular route being studied. Therefore, when aircraft routes are near each other, aircraft position uncertainty results in a probability of the aircraft coming within a specified keep out distance. If the probability value exceeds a threshold, a conflict is declared. A conflict can be resolved by maneuvering one or both of the affected aircraft.

Predicting cumulative collision conflict probability for aircraft with constant velocity is very similar to space vehicle collision probability prediction. For aircraft, the probability of a conflict collision depends on the conflict volume, the relative position error, and the trajectories of the respective aircraft. First, one propagates the aircraft for thirty minutes. Next, coarse screening is performed to identify potential conflicts. Finally, collision conflict probability is predicted. The cumulative collision conflict probability method assumes that the relative velocity is constant and that the relative position error covariance matrix is constant during the encounter. These assumptions are not always valid, because aircraft routing involves turns at way points. In addition, along-track position errors grow between position data updates, The vertical position errors also grow during ascent or descent. Thus, a constant error covariance matrix throughout the encounter between the two aircraft produces uncertain risk of collision. The cumulative collision conflict probability formulation assumes both aircraft were traveling from minus infinity to plus infinity. This assumption can result in small errors in the collision probability. A slight increase in the predicted collision conflict probability could result. For these reasons, a general formulation for collision conflict probability is needed.

A conventional conflict keep-out box is a conflict volume that may be a cylinder 5.0 NMI in radius and 4,000 ft in height for aircraft flying above 29,000 ft. For aircraft flying below 29,000 ft, the cylinder height is reduced to 2,000 ft and a conflict occurs for aircraft with less than 5.0 NMI separation having altitudes that differ by less than ±1,000 ft. The cylinder is centered on the flying aircraft and oriented vertically with its height corresponding to altitude. Thus, when an aircraft is predicted to come within 5.0 NMI lateral distance or ±2,000 ft vertical distance, a conflict exists. The time of conflict resolution is a tradeoff between efficiency and error uncertainty. When the maneuver is too far in advance, it is efficient and therefore smaller but growth in position uncertainty reduces confidence in the computed collision conflict probability. When the maneuver is not far enough in advance, confidence in the computed collision probability is high but less time is available for the maneuver to avoid the conflict and a larger less efficient maneuver must be made. Thus, there is an optimum maneuver time to resolve a conflict efficiently. The ability to predict conflicts efficiently is needed to help air traffic controllers.

In level flight, the conflict determinations can be partitioned into vertical and horizontal portions because the cylindrical conflict volume is symmetric in the horizontal plane and there is no cross correlation between vertical and horizontal errors. The probability density is integrated from minus infinity to plus infinity along the relative velocity direction. The result is always unity because the probability density is normalized. The resulting two dimensional integral can be partitioned into two separate error function integrals with limits defined by the dimensions of the conflict cylinder. Thus, the conflict probability reduces to the product of two error function integrals.

Vertical and horizontal errors are correlated in the case of non-level flight. In addition, the cylindrical conflict volume takes a more complex shape when the conflict volume is projected to an encounter plane, which is normal to the relative velocity. An approximate solution and a Monte Carlo simulation approach has been proposed to overcome the difficulties of computing conflict probabilities for more complex shapes of the keep-out volume. The computational requirement is significantly greater with the Monte Carlo method. Although the FAA is currently modernizing the traffic control system by increasing automation, effective computerized methods to predict aircraft conflict and avoidance maneuvering are needed.

Collision conflict prediction methods have been used to determine when a spaceborne or airborne vehicle is likely to have a significant collision risk with another object. A contour integration method has already been used on asymmetric space vehicle collision probability and collision probability for space tethers. When there is a significant collision risk, it is then desirable to perform a collision avoidance maneuver prior to the collision time for both aircraft and spacecraft. Spacecraft collision avoidance is also becoming an increasing concern as the number of space objects continues to increase over time. There are currently over 9,500 tracked orbital objects. The need for collision avoidance maneuvers is correspondingly increasing as the number of operational satellites and associated debris objects increase. The narrow altitude bands associated with communication satellite constellations in both low earth orbit and geosynchronous earth orbit requires improved collision prediction and avoidance methods because satellites occupying the same altitude range have increased risk of collision. The collision hazard posed by debris and other operational satellites has been increasing to the point where collision avoidance maneuvers should be considered as a means to mitigate the collision risk. The increasing collision hazard is forcing manned vehicles to perform unwanted collision avoidance maneuvers. Such maneuvers are disruptive to mission operations. For example, the Space Shuttle performs a maneuver, when the predicted miss distance is less than two kilometers radially, five kilometers in-track and two kilometers out-of-plane. The International Space Station has already performed two collision avoidance maneuvers based on collision probability predictions. Collision avoidance maneuvers for space vehicles reduce vehicular life span due to propellant consumption while additional thruster firings increase the potential for propulsion system failure. The decision to perform a collision avoidance maneuver is based on a cost-risk analysis that requires a quantifiable measure of risk. Unlike a keep-out box criterion, collision probability provides the needed quantification of risk. Collision probability can be weighed against the propellant consumed and shortened operational life span of the space vehicle. The value of the space asset can be used to establish a collision risk threshold. Because the amount of propellant is directly related to an operational lifetime and revenue of a satellite, maneuvers should be performed in the most efficient and effective manner possible. This requires searching a four-dimensional space for an optimal solution. This space consists of the time of application, velocity magnitude and direction, right ascension and declination, of the applied maneuver. Computational efficiencies in propagation, collision probability calculation and optimization are required to allow sufficient time for maneuver planning.

The maneuver is made to reduce the collision risk to an acceptable level. The most effective maneuver is one that requires minimum maneuver velocity and associated propellant. There are three components necessary to determine the most effective maneuver: maneuver time, maneuver direction, and maneuver magnitude. These components need to be determined expeditiously so that enough time is allowed for performing operational tasks required to implement the maneuver. Hence, there exists a need to timely determine the optimal maneuver for avoidance of a pending collision. Numerical methods have been used for conflict avoidance and maneuvering, but the numerical method often required more time to predict a collision and maneuver than is available during a pending collision. These and other disadvantages are solved or reduced using the invention.

SUMMARY OF THE INVENTION

An object of the invention is to provide a method for predicting potential collisions.

Another object of the invention is to reduce risk to a subject object from collision with one or more target objects.

An object of the invention is to provide a method for screening target objects for those that come within an approach distance to a subject object for indicating a possible collision conflict.

Another object of the invention is to provide a method for determining a conjunction between a target object and a subject object when the separation distance is within a critical distance through high fidelity trajectory propagation for indicating a probable collision conflict.

Yet another object of the invention is to provide a method for determining a collision conflict probability of a collision between a subject object and a target object through high fidelity trajectory propagation, through coordinate rotation and scaling based on error covariance matrices, and through contour integration.

Another object o f the invention is to provide a method for determining an optimum maneuver including a maneuver time, maneuver direction, and maneuver magnitude of a maneuvering subject object for avoiding a collision with a target object through a gradient method and a root finding method.

The invention relates to collision prediction and collision avoidance maneuvering. The invention method determines risk of a potential collision between a subject object and a target object, and determines an optimum maneuver to avoid potential collision. The subject object may be an aircraft, an orbiting spacecraft, a launch spacecraft, or a free space traveling spacecraft. The target object may be one of many target objects that may also be an aircraft, an orbiting spacecraft, al launch spacecraft, a free space traveling spacecraft, space debris, or airborne debris.

The method first determines when the subject object will come within a large approach distance for screening target objects that have an impossible collision conflict with the subject object. For those target objects that do not have an impossible collision conflict, the method then determines whether the closest approach separation distance between the subject object and the target object will be less than a critical distance for determining a conjunction through trajectory propagations. Conjunction determinations use high-fidelity time-stepped trajectory propagation.

When it is determined that a target object will have a conjunction with the subject object, then the method determines the collision probability between the subject object and the target object. The collision probability is a risk of a potential collision. The collision probability determination uses an error covariance matrix that is transformed to an encounter frame by rotation and scaling. In the encounter frame, a contour integration method is used for efficient computation of collision conflict probability. When a target object will have a collision conflict probability with the subject object above a predetermined collision conflict probability threshold, that is, above a predetermined risk value, then a maneuver may be executed for collision avoidance.

When the subject object will have collision conflict probability above the predetermined collision conflict probability, indicating a need for maneuver avoidance, the method then determines an optimum maneuver, in terms of maneuver direction, maneuver magnitude, and maneuver time so as to reduce the collision conflict probability below the predetermined probability for reducing risk of collision. The direction and magnitude of the maneuver velocity is found in two steps. The direction is found by using a gradient method, which determines the maneuver direction that results in the largest reduction in collision probability for a given maneuver velocity magnitude. Once the direction is found, the maneuver magnitude is found by using a search method, such as a Secant root or Newton root search method that lowers the collision probability to below the collision probability threshold. A maneuver choice can be made from the selection of optimal maneuvers from maneuver options. When a maneuver is required, a maneuver duration is selected for indicating possible maneuver times prior to the conjunction. For each time step during the maneuver duration, the optimum maneuver is found that reduces the collision probability. The optimum maneuver is determined in a computationally efficient manner that requires negligible amounts of time. This efficient computation allows sufficient time for planning the maneuvers.

The method uses various processes, including conjunction determinations through trajectory propagation, collision probability prediction through coordinate rotation and scaling based on error covariance matrices, and numerical searching for optimum avoidance maneuvers. Significantly, the collision probability calculation is performed using an enhanced contour integration method for rapid computation. The maneuver avoidance method determines the effect of a vehicular maneuver on the collision probability by propagating the vehicle from the potential collision time backwards to the maneuver time, and then applying the maneuver and propagating the vehicle forward in time to the potential collision time. Significantly, the maneuvering direction is determined using a gradient method. The propagation is analytically performed using either conventional Keplerian two-body mechanics or high fidelity trajectory propagation.

The method is applicable to aircraft having level, turning, ascending and descending flight paths, and spacecraft having orbital flight paths, launch vehicles having launch paths, or spacecraft having free space flight paths. Collision probability for aircraft has inputs including altitude position, speed and direction, and safety keep-out volumes. Spacecraft use a hard-body volumes for collision probability and aircraft use a keep-out volume for conflict prediction, but herein, both nomenclatures are mathematically treated the same for collision probability computations.

Collision probability prediction for spacecraft has inputs including the respective state vectors, error covariance matrices, and physical sizes of the subject and target objects with the sizes being used as safety keep-out volumes. Because the relative velocity of orbital objects at the closest approach is very large compared to the relative accelerations, the relative velocity is considered constant during the encounter period of closest approach. When more than one collision is possible for the subject object, such as for orbital bodies having cyclic orbits, the cumulative collision probability is used in place of the single collision probability. The cumulative collision probability is the sum of collision probability for each potential collision. The method enhances the ability to predict potential collisions and to determine avoidance maneuvers in a timely manner so as to avoid collision. This would enable operational collision risk of aircraft and spacecraft to be reduced in an automated manner. These and other advantages will become more apparent from the following detailed description of the preferred embodiment.

DETAILED DESCRIPTION OF THE PREFERRED EMBODIMENT

Figure 1:
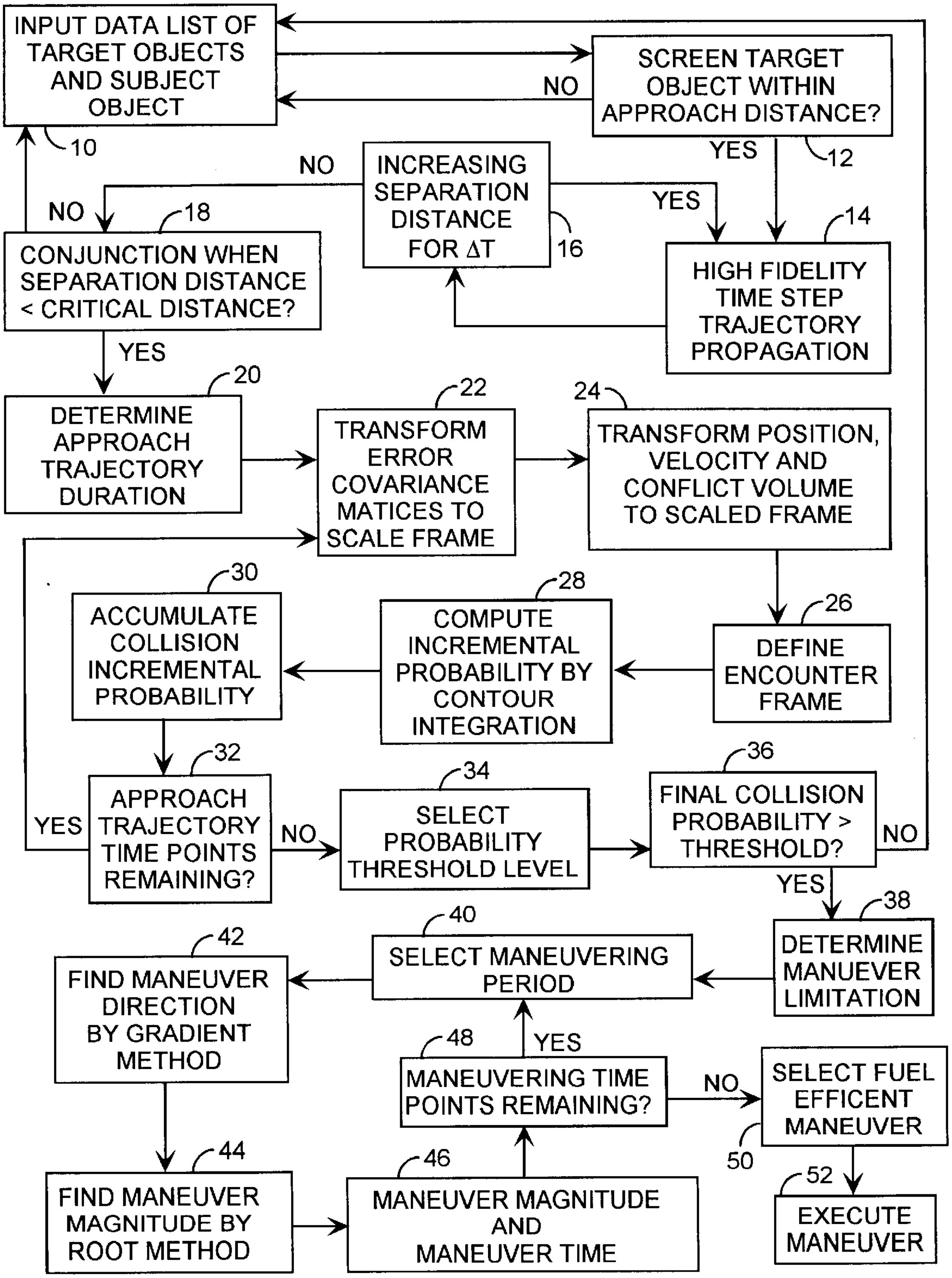
FIG. 1 is a conflict prediction and avoidance maneuvering process.

An embodiment of the invention is described with reference to the figures using reference designations as shown in the figures. Referring to FIG. 1, the method is generally divided into three processes that determines conjunctions, collision probabilities and avoidance maneuvers. The method determines possible conjunctions in steps 10 through 18 for screening for target objects that approach the subject object within a critical miss distance, determines the collision probability in steps 20 through 36 for those target objects that have a conjunction with the subject object, and determines an optimum collision avoidance maneuver in steps 38 through 52 for maneuvering the subject object to avoid a potential collision with the target object with the collision probability below a predetermined threshold collision probability. The method can be applied to aircraft, orbital bodies, launch vehicles and free space spacecraft, and more generally, to any moving body.

A tracking data catalog 10 is maintained with data for indicating the paths of many target objects and the subject object. The data for each object is with respect to an initial time, that is, the current time, and hence, the data includes time data indicating the current time of the data. The data for each object includes an initial position, initial velocity, an error covariance matrix, and a conflict volume, particularly useful for spacecraft. The tracking data catalog 10 is maintained with a data list indicating the orbital paths of orbiting bodies, flight paths for aircraft, launch trajectories for launch vehicles, or free space paths for free space vehicles, any one of which can be a target object or the subject object. In the case of orbital bodies, for example, a subject object orbiting satellite, or for example, a target object orbiting space debris, the data list 10 includes position, velocity, apogee, perigee, error covariance matrix and conflict volume data associated with each target object so as to describe the path and size of the target object. In the case of flying aircraft, the data list 10 can be maintained with flight data, for example, longitude, latitude, and altitude, as a position indication, with a velocity vector, an error covariance matrix and a keep-out box volume as a safety conflict volume. For free space vehicles, the data list can be maintained 10 to include current positions, velocities, error covariance matrices and conflict volumes that may be for example, hard-body volumes such as a sphere approximating a space vehicle. For launch vehicles experiencing timed thrust, the data list can be maintained 10 with trajectory data of expected timed positions, respective expected velocities, error covariance matrices and conflict volumes.

The subject object may have potential collisions with several respective target objects. Of all of the cataloged target objects in the tracking data catalog 10, only a few of these target objects may possibly have a potential collision with a subject object. Hence, the method preferably firstly screens 12 target objects that have effectively no possible risk of collision with the subject object so as to eliminate unnecessary conjunction determinations and collision prediction computations.

The screening process 12 screens target objects that will not approach the subject object within a predetermined screening approach distance. In the case of orbital bodies, the screening process 12 also receives the apogee and perigee data of target subject and subject objects from the catalog 10. The screening process for orbital bodies may only examine the apogee and perigee data for computing by simple subtractive screening computation the closest approach distance being then compared to the screening approach distance. In the case of aircraft, the screening process 12 may only determine when a collision is impossible by simply determining the altitude difference between the subject object and the target object. For example, when the subject object is flying at an altitude of less than 10,000 feet, and the target object is flying at an altitude that is greater than 30,000 feet, the screening process 12 eliminates from further consideration the target object having at least a 20,000 foot approach distance.

The screening process 12 is applied to each of the target objects in turn to determine if a collision is impossible. The screening process 12 provides an indication that a respective target object will come within the approach distance to the subject object. If the target object will not come within the screening approach distance, then a collision is deemed impossible, and then, data for another target object is obtained from the data catalog 10. In this manner, the screening process 12 grossly screens all of the target objects listed in the data catalog 10. When it is determined that a target object is or is going to be within the screening approach distance, and a collision is deemed possible, and further processing is deemed necessary to determine if the target object will conjunct 18 with the subject object within a critical distance using highly accurate trajectory propagation over a trajectory propagation duration. That is, the target objects are effectively screened again, in more detail, for determining only those target objects that will have very close conjunctive approaches with the subject object within a predetermined critical distance indicative of a probable collision. The conjunction determination requires additional data processing. A conjunction is declared 18 when the closest separation between the subject object and the target object, as propagated forward in time over the trajectory propagation duration, is less than the predetermined critical distance so as to indicate that a collision is probable so as to indicate that collision conflict probability computations are necessary. A conjunction is not declared when the closest approach distance is more than the predetermined critical distance so as to indicate that a collision is highly improbable, so as to avoid unnecessary collision conflict probability computations.

The high fidelity trajectory propagation 14 determines at consecutive trajectory propagation duration time steps over the trajectory propagation duration when a collision is probable for each target object that was determined to have a possible collision, that is a conjunction, with the subject object. Determining conjunctions 18 between the subject object and the target objects uses high fidelity trajectory propagation 14 of the respective time stepped propagated position vectors, velocity vectors, and error covariance matrices while the separation distance between the objects is computed at each trajectory propagation time step during the propagated trajectory duration along the high fidelity propagated trajectory.

The high fidelity trajectory propagation 14 receives an initial position, an initial velocity vector, an initial error covariance matrix and a conflict volume for the subject object and the target object for a trajectory propagation initial time from the data catalog 10, after an indication of a close approach within the screening approach distance from the screening process 12. The high fidelity trajectory propagation 14 outputs propagated positions, velocities and error covariance matrices of subject object and target objects at each trajectory propagation time step over the trajectory propagation duration of interest for the conjunction determination 18. High fidelity trajectory propagation 14 propagates both subject object and target object from initial time to each trajectory propagation time step through the trajectory propagation duration of interest. The high fidelity trajectory propagation 14 propagates the position, velocity, and error covariance matrix for each time step, so that the next time step propagation position can be determined for indicating the separation distance at each time step.

The trajectory propagation duration is determined 16. Several algorithms may be used to determine the trajectory propagation duration. The trajectory propagation duration can simply be a predetermined amount of time from the current time. For orbital bodies, the trajectory propagation duration may be, example, a multiple of orbital periods, such as, three orbital periods of the target object or subject object. That by way of example, an orbital body may approach a geosynchronized body every orbit, and a plurality of orbits may provide multiple close approaches, and hence, for orbital bodies, the trajectory propagation duration may be multiple orbital periods so as to evaluate the separation distance during each orbit approach, even though, between approaches, the separation distance may increase and decrease each orbit cycle. Preferably, the high fidelity trajectory duration determination 16 examines the separation distance, based on the current propagation 18, from the current time, and continues to increase the propagation duration as long as the separation distance continues to decrease as the subject object approaches the target object. The duration determination could then expand the duration for a predetermined amount of time past the time step when the separation distance begins to increase. The high fidelity trajectory duration is determined so as to capture from the current time and over the duration time, the closest approach distance for conjunction determinations.

At each time step of the high fidelity trajectory propagation, the separation distance between the subject object and target object is determined from the initial time to the current time of high fidelity trajectory propagation. As the subject object and target object are propagated in time forward, the separation distance is computed at each trajectory propagation time step. Conjunction determinations 18 can be made for each time step trajectory stepped time point. Hence, the propagated trajectory duration of interest is divided into the time step trajectory points for respective conjunction determinations 18. The trajectory time points remaining during the determination 16 determines if the current trajectory time is the end of the time trajectory propagation duration of interest. The propagated positions, velocities, and error covariance matrices of the target object and subject object are computed for each time step until a conjunction is declared or until the end of the trajectory propagation duration when no conjunction is declared. The conjunction determination 18 is preferably performed for each trajectory time step until all trajectory time steps 16 are evaluated after respective high fidelity propagations 14. The separation distance for each point is compared to the predetermined critical miss distance to determine if a conjunction will occurred. When no conjunction is declared 18, and no trajectory time steps are remaining, then the target object is deemed to miss the subject object within a safe separation distance, and the next target object in the catalog 10 is processed through the screening process 12 and the high fidelity propagation 14. Hence, all of the target objects are screened for critical miss distances for conjunction declarations 18. When the separation distance falls below the critical miss distance during high fidelity trajectory propagation 14, that is based on the size of the propagated error covariance matrices, then a conjunction is declared 18. When a conjunction is declared 18, then a collision probability calculation is deemed necessary.

Figure 2:
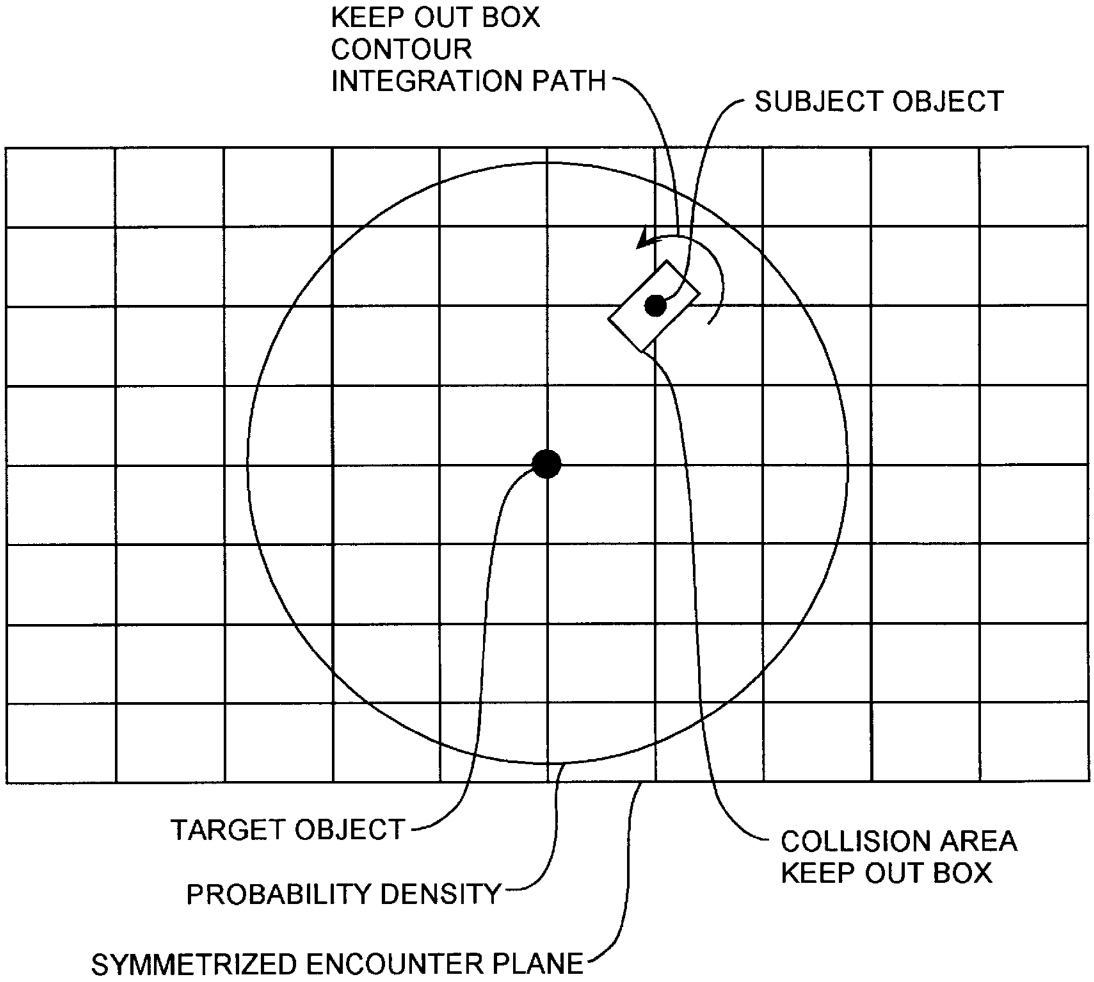
FIG. 2 is a contour integration diagram.

Referring to FIGS. 1 and 2, after a conjunction is declared 18, the collision conflict probability is determined by process steps 20 through 36 for calculating the probability of a collision that can be compared to a threshold level of acceptable risk for determining if a maneuver should be made.

The propagated positions, propagated velocities, and the propagated position error covariance matrices from the high fidelity trajectory propagation 14 for the subject object and target objects determined during the high fidelity propagation 14 and the conjunction time from the conjunction determination 18 are used for calculating the collision conflict probability. An approach trajectory duration is determined 20. The approach trajectory duration can be determined using various methods to provide a time span of interest when the subject object and target object are near the closest approach distance. For example, the approach trajectory duration can be 2Δt, where Δt is a predetermined amount of time, and the time of the closest approach is at the center of the 2Δt approach trajectory duration. The approach trajectory duration is divided into trajectory time steps, preferably of the same duration as the high fidelity trajectory propagation 14. To the extent that the 2Δt approach trajectory duration is beyond the high fidelity trajectory propagation duration, the high fidelity trajectory propagation 14 can be extended to provide additional data so as to generate complete high fidelity propagated trajectory data over the entire 2Δt approach trajectory duration. Hence, for each approach trajectory duration time step, there is a propagated position, propagated velocity, and a propagated error covariance matrix.

The error covariance matrices for the subject object and the target object are transformed 22 by combining, rotating, and scaling the error covariance matrices into a scaled reference frame at each of the approach trajectory duration time steps. The propagated positions, velocities and error covariance matrices at each of the approach trajectory duration time steps are firstly in respective initial reference frames. When the initial reference frames are the same, the propagated error covariance matrices can be combined by matrix addition into combined error covariance matrices in a common reference frame. When the initial reference frames are not the same, the propagated error covariance matrices can be combined using a combining matrix for transforming the propagated error covariance matrices of the subject and target objects into the common reference frame, and then combining them by matrix addition into combined error covariance matrices in a common reference frame. That is, each subject object and target object pair of initial propagated error covariance matrices are combined into a common reference frame. Error covariance matrices having a common reference frame are combined by matrix addition to form the combined error covariance matrices in the common reference frame at each of the approach trajectory duration time steps.

The combined error covariance matrices are in a common reference frame that is relative to the respective initial reference frames. A rotational matrix is used for rotating the combined error covariance matrices in the common reference frame into diagonal error covariance matrices in a diagonal reference frame at each of the approach trajectory duration time steps. A scalar matrix is used for scaling the diagonal error covariance matrices in the diagonal reference frame into scaled error covariance matrices in the scaled reference frame at each of the approach trajectory duration time steps. The transformation process 22 effectively converts the initial error covariance matrices of the target object and subject object in respective initial reference frames into scaled error covariance matrices in the scaled reference frame, where the scaled error covariance matrices are diagonal matrices. The transformation process 22 combines, rotates, and scales the error covariance matrices into scaled error covariance matrices that are symmetric in three dimensions in the scaled reference frame. The transformation process 22 is performed for the initial error covariance matrices of the target object and subject object in respective initial reference frames for each of the approach trajectory duration time steps.

The propagated trajectory positions and velocities for the subject object and target object are vectors, and the conflict volume is a vector of surface points. The respective propagated positions, respective propagated velocities, respective conflict volume, the transformation matrix, rotational matrix, and the scalar matrix, are used to transform 24 the respective propagated positions, respective propagated velocities, and respective conflict volumes into respective scaled positions, respective scaled velocities, and respective scaled conflict volumes in the scaled reference frame at each approach trajectory duration time step. The respective scaled positions and respective scaled velocities are combined into the scaled positions and scaled velocities between the subject objects and target objects by vector subtraction. That is, the scaled velocities are obtained by subtracting the respective scaled velocities and the scaled positions are found by subtracting the respective scaled positions in the scaled reference frame. The scaled velocities are relative scaled velocities and the scaled positions are relative scaled position, relative between the subject object and the target object. The respective scaled conflict volumes are combined by superpositioning vector addition to form a scaled keep-out box in the scaled reference frame.

The scaled positions, scaled velocities, scaled keep-out box, and scaled error covariance matrices in the scaled reference frame are aligned 26 to an encounter reference frame for each of the approach trajectory duration time steps. An alignment matrix is used for coordinate rotation to align an alignment axis, such as the Z axis, of the scaled reference frame, along the relative velocity vectors at each approach trajectory duration time step. The initial reference frames are rotated and scaled so that z-axis lies along the relative velocities of the subject and target objects. The relative velocity vector alignment is orthogonal to the encounter plane for efficient computation of the collision conflict probability at each approach trajectory duration time step. The encounter reference frame is a three dimensional reference frame with the z axis extending along the relative velocities orthogonal to the x-y encounter plane, which contains a two-dimensional probability density function.

An incremental collision probability at each approach trajectory duration time step is computed 28 in the encounter reference frame as the product of a z-axis incremental probability and a x-y plane incremental probability. The z-axis component of scaled relative position between subject object and target object is used in a z-axis probability density function to obtain the z-axis incremental probability. The x-y plane incremental probability at each approach trajectory duration time step is computed 28 by integrating the x-y plane probability density function over the collision area keep out box in the x-y plane representing the conflict volume. The x-y plane probability is reduced to a contour integration about the perimeter of the collision area keep out box as shown in FIG. 2. The keep-out box is the conflict volume projected onto the x-y encounter plane containing the x-y plane probability density function. An integration path extends along the perimeter of the keep-out box. The probability density is scaled in the encounter frame so that the probability density is symetric in the encounter frame.

The probability density function in the x-y plane is a Gaussian or Normal distribution function visualized as a bell shaped curved centered at the origin of the encounter plane. A radius from the center is related to a probability value. With scaling and rotation into the encounter reference frame, a one-dimensional contour integral using polar coordinates can be used to integrate around the path defined by the perimeter of the keep-out box. The probability density function is scaled in the encounter frame and is a function of radius at any polar angle. The polar coordinates, in terms of the radius from the center of the encounter plane and the angle, enables efficient one-dimensional computation of the x-y plane incremental probability using a one-dimensional integral as a function of the radius extending to the keep-out box at various angles defining the perimeter of the keep-out box. The contour integration path is one-dimensional around the keep-out box, and is analytically related to the incremental probability. An additional benefit of the path integral formulation is that asymmetric hard-body shapes can be treated, such as tethers 28. A twenty-fold improvement in computational speed may be realized using contour integration.

The incremental collision probability for each approach trajectory duration time step is found by multiplying the z-axis incremental probability by the x-y plane incremental probability. The incremental collision probabilities for each approach trajectory duration time step is accumulated 30 into an accumulative collision probability. That is, the accumulative collision probability is the sum of incremental collision probabilities for each trajectory duration time step.

The error covariance matrices are combined, rotated and scaled 22, the propagated positions, propagated velocities and conflict volume are rotated, scaled and combined 24. The scaled positions, scaled velocities, and keep-out box are aligned 26 to the encounter reference frames. The incremental collision of the approach trajectory duration time steps 32 until processed through the approach trajectory duration. The final value of the cumulative collision probability computed at the last approach trajectory duration time step at the end of the approach trajectory duration is a final collision probability.

A collision probability threshold is selected 34. The threshold level can be selected based on design specifications. For example, the subject object is a manned vehicle, then the collision probability threshold level could be set to a low value to provide high protection to a valuable asset. If the subject object is a sensitive or high-asset value object, such as a communications satellites the threshold value could be at another low level. The threshold value could be based upon the amount of fuel remaining in the subject maneuvering vehicle, as the fuel reserve represents remaining life time of the subject maneuvering vehicle, and as such, fuel reserves can be considered when selecting the collision probability threshold level 24. The collision probability threshold can be a set of predetermined values for classes of subject objects adaptively selected by operators for changing circumstances. When the final collision probability is determined 36 to be above the collision probability threshold 34, then a collision is deemed predicted, and a maneuver is deemed required to avoid a collision, that is, to avoid unacceptable risk of a collision.

A general formulation requires an ability to compute the instantaneous rate of collision conflict probability for each approach trajectory duration time step. The position, velocity and error covariance matrix for each object is propagated to each approach trajectory duration time step. Total collision probability can be computed by accumulating the incremental probabilities or equivalently by using the incremental probability time rate of change. The incremental probability rate of the incremental collision probability for each time step is calculated by dividing the incremental collision probability by the time step duration. The total probability of conflict over a specified time is obtained by integrating the incremental collision probability rate over the approach trajectory duration time 30.

The collision probability method of steps 20 through 36 is applicable to changing error covariance matrices, for example, due to aircraft turns and descent maneuvers. When the relative velocity between the aircraft remains constant and the position error covariance remains constant, the cumulative probability of conflict is equal to the x-y plane accumulative probability for any one of the approach trajectory duration time steps. If the relative velocity or error covariance matrix changes over time, than the cumulative collision probability is found by accumulating incremental collision probability for each approach trajectory duration time step.

If the keep-out box and respective velocities, error covariance matrices of the subject object and the target object in the combined reference frame are constant, then the accumulative collision probability is equal to the x-y plane incremental probability In this case, the x-y plane incremental probabilities for each approach trajectory duration time step are equal and the cumulative collision probability is equal to the product of the x-y plane incremental probability and the sum of the z-axis incremental probabilities. The sum of the z-axis incremental probabilities equals one because the z-axis probability function is normalized to unity. The accumulative collision probability 30 for this special case is determined by the value of the x-y plane incremental probability for any one of the approach trajectory duration time steps. This x-y plane accumulative collision probability method requires less computational effort and hence time, than does the accumulative incremental collision probability method for each trajectory duration time step. This computational efficiency can be achieved when the keep-out box and respective velocities, error covariance matrices of the subject object and the target object in the combined reference frame are constant.

Aircraft collision probability, that is, conflict probability can be computed using contour integration. Three factors that affect aircraft collision conflict probability include aircraft trajectory, position error covariance matrices, and conflict volume shape. During aircraft turns and ascent and descent conditions, aircraft trajectory and position error covariance change as a function of time. The time dependence is accounted for by dividing the approach trajectory into the approach trajectory duration time steps and computing the incremental collision probability at each time step. The cumulative collision probability is found by accumulating the incremental collision probabilities for each approach trajectory duration time step. Position error covariance matrices and the relative velocities is assumed constant during each respective time step. However, error covariance matrices and relative velocities can be different for each approach trajectory time step. The cumulative collision conflict probability is found by adding the incremental collision conflict probability associated with each approach trajectory duration time step over approach trajectory duration. In this manner, the cumulative collision conflict probability 30 includes time-dependent effects.

The position and velocity of each object is transformed into the scaled coordinate reference frame. The relative position and velocity in the scaled coordinate frame are used to define the encounter reference frame. The encounter frame has the z-axis aligned with the relative velocity vector and the x-axis perpendicular to the z-axis and clocked to align with the relative separation vector. The conflict volume of the keep-out box of FIG. 2, which is assumed centered about the target object is transformed into the inertial frame and then to the encounter frame. Because the probability density is symmetric, the probability density along each axis is decoupled from the other axes in the encounter reference frame. The polar radial coordinate r is integrated directly, thus reducing the three-dimensional contour integral into a one-dimensional contour integral about the keep-out box 28. The integration along the z-axis is made in incremental steps assuming that probability density, keep-out box area, and relative velocity are constant over each time step. However, the values are allowed to change from time step to time step to account for changing probability density, relative velocity and keep-out box area. Because the rate of change of the velocity direction is assumed to be zero when computing incremental collision conflict probability, a small amount of error is introduced during turning maneuvers. These errors are usually small because turns occur for only a small fraction of the total aircraft trajectory.

Mathematical Nomenclature Table

| | |
|---|---|
| $C_i$ | Covariance matrices in initial reference frame |
| $C_{Ti}$ | Total covariance in inertial common reference frame |
| $C_{Td}$ | Total covariance in diagonal reference frame |
| dθ | Contour integration polar angle in the encounter frame |
| $f_i$ | Point in conflict volume |
| $P_i$ | Initial to common reference frame transformation |
| $PR_I$ | Incremental collision conflict probability |
| $PR_R(t)$ | Collision conflict probability rate |
| $PR_T$ | Cumulative collision conflict probability |
| Q | Diagonal transformation matrix |
| r | Radial polar coordinate in the encounter frame |
| S | Scaled transformation matrix |
| U | Transformation matrix WSPQ for transformation of the initial frame into the encounter frame |
| V | Relative velocity vector |
| $V_S$ | Relative velocity in the scaled reference frame |
| W | Alignment matrix for aligning the scaled frame to the encounter reference frame |
| X | Relative position |
| $X_S$ | Relative position in scaled reference frame |
| $X_I$ | Point on Conflict Area Perimeter |
| z | Z-axis in the encounter frame |
| σ(i) | Standard deviations of error covariance for each axis in diagonal frame |
| λ | Non-dimension parameter |

The coordinate transformations are needed to transform the positions, velocities, error covariance matrices and conflict volume for an object into the scaled reference frame for each approach trajectory duration time step. Because the error covariance matrices are defined in the initial reference frame of each aircraft, the error covariance matrices are transformed into the common reference frame. The transformations from local to inertial frame for each object are given by $P_1$ and $P_2$, respectively. The respective covariance matrices are transformed to the inertial frame in the usual manner by C1 covariance equation $C_{1I}=P_1C_1P_1^{-1}$ and C2 covariance equation $C_{2I}=P_2C_2P_2^{-1}$. The relative position error covariance matrix is obtained by adding $C_{1I}$ and $C_{2I}$ so that $C_T=C_{1I}+C_{2I}$ in a total covariance equation. The transformation from the inertial frame to the frame in which $C_T$ is diagonal is given by a Q matrix in a $C_{Td}$ total diagonal transformation equation.

$$C_{Td}=QC_TQ^{-1}=\begin{pmatrix}\sigma(1)^2 & 0 & 0\\ 0 & \sigma(2)^2 & 0\\ 0 & 0 & \sigma(3)^2\end{pmatrix}$$

In the $C_{Td}$ transformation equation, the terms σ(i) are the standard deviations along the respective axes. The transformation from the diagonal frame to the scaled frame 24 is given by scaled matrix S of an S scaled matrix equation.

$$S=\begin{pmatrix}1 & 0 & 0\\ 0 & \sigma(1)/\sigma(2) & 0\\ 0 & 0 & \sigma(1)/\sigma(3)\end{pmatrix}$$

The relative error covariance matrix $C_{TS}$ in the scaled frame 24 is found using a $C_{TS}$ scaled frame equation.

$$C_{TS}=SC_{Td}S^{-1}=\begin{pmatrix}\sigma(1)^2 & 0 & 0\\ 0 & \sigma(1)^2 & 0\\ 0 & 0 & \sigma(1)^2\end{pmatrix}$$

The relative position and velocity in the inertial frame are respectively given by $\vec{X}=\vec{r}_1-\vec{r}_2$ relative position equation, and a $\vec{V}=\vec{u}_1-\vec{u}_2$ relative velocity equation, where $r_i$ and $u_i$ are states of the two aircraft. The relative position and velocity vectors are transformed from the inertial frame to the scaled frame 24, by a $\vec{X}_S$scaled frame relative position equation $\vec{X}_S=SQ\vec{X}$ and a $\vec{V}_S$ scaled frame relative velocity equation $\vec{V}_S=SQ\vec{V}$. The relative position and velocity vectors in the scaled frame are used to define the transformation to the encounter frame, which has its z-axis parallel to the relative velocity vector. The x-axis of the encounter frame is perpendicular to the z-axis and clocked to point at aircraft two. Because the transformation from the scaled frame to the encounter frame W, is an orthogonal transformation and the relative error covariance is symmetric, the error covariance remains unchanged in the encounter frame where $C_{Te}=WC_{TS}W^{-1}=C_{TS}$. The cylindrical conflict volume is centered on aircraft number two. Any point $f_i$ within the cylindrical conflict volume can be transformed to the encounter frame by the transformation U, which is given by $f_{ie}=WSQP_2f_i=Uf_i$.

The cumulative collision conflict probability is given by a cumulative collision conflict probability equation.

$$PR_T=\frac{1}{(2\pi)^{3/2}\sigma(1)^3}\iiint_{vol}\exp\left(\frac{-(x^2+y^2+z^2)}{2\sigma(1)^2}\right)dx\,dy\,dz$$

The limits of integration in the cumulative collision conflict probability equation are defined by the volume swept out by the conflict cylinder in the encounter frame. Because z is in the direction of relative velocity, it is convenient to transform to cylindrical coordinates with the z-axis aligned with the cylinder axis. The cumulative collision conflict probability equation becomes a revised cumulative collision conflict probability equation.

$$PR_T = \frac{1}{(2\pi)^{3/2}\sigma(1)^3}\int\int\int_{vol} \exp\left(\frac{-z^2}{2\sigma(1)^2}\right)\exp\left(\frac{-r^2}{2\sigma(1)^2}\right) r\,dr\,d\theta\,dz$$

The r integration can be performed immediately, yielding a modified cumulative collision conflict probability equation.

$$PR_T = \left[\frac{1}{\sqrt{2\pi}\,\sigma(1)}\int_{-\infty}^{\infty}\exp\left(\frac{-z^2}{2\sigma(1)^2}\right)dz\right]\left(\frac{1}{2\pi}\right)\oint_{perimeter}\left(1-\exp\left(\frac{-r^2}{2\sigma(1)^2}\right)\right)d\theta$$

The closed path contour is about the perimeter of the keep-out box area in the encounter plane. When the relative velocity and relative error covariance are constant throughout the encounter, the bracketed term in the modified cumulative collision conflict probability equation is equal to one and the cumulative collision conflict probability is given by a simplified cumulative collision conflict probability equation.

$$PR_T = \left(\frac{1}{2\pi}\right)\oint_{perimeter}\left(1-\exp\left(\frac{-r^2}{2\sigma(1)^2}\right)\right)d\theta$$

When the relative velocity or the relative error covariance change, the incremental collision conflict probability is obtained by an incremental collision conflict probability equation.

$$PR_I = \left[\frac{dz}{\sqrt{2\pi}\,\sigma(1)}\exp\left(\frac{-z^2}{2\sigma(1)^2}\right)\right]\left(\frac{1}{2\pi}\right)\oint_{perimeter}\left(1-\exp\left(\frac{-r^2}{2\sigma(1)^2}\right)\right)d\theta$$

The simplified cumulative collision conflict probability equation can be used in the incremental cumulative collision conflict probability equation to obtain a revised incremental collision conflict probability equation.

$$PR_I = \frac{dz}{\sqrt{2\pi}\,\sigma(1)}\exp\left(\frac{-z^2}{2\sigma(1)^2}\right)PR_T$$

Because both dz and σ(1) are permitted to change during the encounter, it is useful to define the non-dimensional parameter λ, which is defined by $\lambda = z/\sigma(1)$. The revised incremental collision conflict probability equation can be rewritten as a $PR_I$ modified incremental collision conflict probability equation.

$$PR_I = \frac{d\lambda}{\sqrt{2\pi}}\exp\left(\frac{-\lambda^2}{2}\right)PR_T$$

The collision conflict probability rate can now be obtained by dividing the modified incremental collision conflict probability equation by the time increment associated with dλ to obtain a $PR_R(t)$ collision conflict probability equation.

$$PR_R(t) = \left(\frac{d\lambda}{dt}\right)\left(\frac{1}{\sqrt{2\pi}}\right)\exp\left(\frac{-\lambda^2}{2}\right)PR_T$$

The collision conflict probability rate is evaluated for each approach trajectory duration time step. The collision conflict probability rates are integrated over the approach trajectory duration time $t_1$ to $t_2$ to obtain the accumulative collision probability equation.

$$PR = \int_{t1}^{t2} PR_R(t)\,dt$$

The accumulative probability equation is preferably used for x-y plane accumulative probability computations for straight line flight path segments for maneuvering spacecraft and aircraft maneuvers, such as turns at way points and descent or ascent maneuvers.

Contour integration of step 28 provides efficient computation of the incremental collision probability. The probability calculation involves aircraft trajectory prediction, estimation of position error covariance throughout the encounter and integration of probability density over the conflict volume. Because the error covariance matrices of the two aircraft are assumed to be uncorrelated, they can be added to obtain the relative error covariance matrix 22. The collision conflict probability is found by integrating the combined position error probability density over the keep-out box during the encounter. This integration uses the scaled reference frame 24 in which the error covariance matrix is symmetric in three dimensions. This enables the inclusion of time-dependent positions, velocities, and error covariance matrices. The contour integration method is accurate without approximations and can compute conflict probabilities for both level and non-level flight trajectories. The methodology for space vehicle collision probability computation is identical to aircraft conflict prediction computation, except that the spacecraft collision hard-body is replaced by the aircraft conflict volume when forming the keep-out box in the encounter frame. However, the aircraft conflict prediction is a collision probability, and the aircraft conflict volume is treated as a hard-body for collision probablity computations, the difference being the names as commonly used in the art.

The position and velocity of each object is transformed to the scaled reference frame. The relative position and velocity in the scaled coordinate frame are used to define the encounter frame. The encounter frame has a z-axis aligned with the relative velocity vector and an x-axis perpendicular to the z-axis that are rotated for alignment of the z-axis with the relative velocity vector with the keep-out box being centered about the target object in the encounter frame.

A subject object is located at the origin of the encounter frame, which is also the center of the relative position error probability density. The conflict volume is centered on the target object, which is displaced from the origin by a distance determined by the closest approach. Points defining the shape of the conflict volume are transformed into the keep-out box in the encounter plane. These points are used in the evaluation of the contour integral. The points are enumerated sequentially in a counter clockwise direction about the perimeter. The angle between the two adjacent vectors, $X_i$ and $X_{i+1}$, is given by $d\theta_i$. By noting its relationship to the cross product between the two vectors, $d\theta_i$ can be obtained from in a cross product equation. The cross product equation can be rewriting as a $d\theta_i$ equation.

$$\vec{X}_i \times \vec{X}_{i+1} = |\vec{X}_i||\vec{X}_{i+1}|\sin(d\theta_i)$$

$$d\theta_i = \sin^{-1}\left(\frac{\vec{X}_i \times \vec{X}_{i+1}}{|\vec{X}_i||\vec{X}_{i+1}|}\right)$$

In the $d\theta_i$ equation, $X_{n+1}$ is $X_1$, which is the last point used is the initial point to form a closed contour. The exponential term in the ith integrand is evaluated in an integrand equation.

$$int_i = \exp\left(\frac{\vec{X}_i^2 + \vec{X}_{i+1}^2}{4\sigma(1)^2}\right)$$

The integral is evaluated by summing values of the integrand times $d\theta_i$ for each pair of points around the contour is a summation equation.

$$sum = \sum_{i=1}^{i=n} int_i d\theta_i$$

Once one complete cycle about the keep-out box is made, the cumulative probability is given by the simplified cumulative probability equation, as $PR_T = -sum/2\pi$, where the origin is excluded from the keep-out box, and as $PR_T = 1 - sum/2\pi$, where origin is included in the keep-out box. The conflict volume for an aircraft may be cylindrical in shape with a five nmi radius and a vertical height of 4,000 ft. For level flight, the conflict volume has a rectangular cross section in the encounter plane as illustrated in FIG. 2. An initial miss distance of five nmi was used for shifting the x position of the keep-out box area in the encounter plane. As the z-axis position uncertainty increases, the height of the rectangle increases in the encounter frame due to scaling effects so that the position error uncertainty $\sigma(1)$ also increases.

The keep-out box in the encounter plane for horizontal flight is approximated,by a rectangular box in a y by x scaled frame. During aircraft descent, the conflict volume cross section changes as a bulging rectangle. During descent, the vertical position uncertainty increases a greater percentage than the horizontal position uncertainty. Thus, the height of the scaled conflict volume decreases over time. The keep-out box in the encounter plane for descending flight is approximated by a rectangular box in a y by x scaled frame with the vertical sides of,the rectangular box bulging outwardly. For a level flight for both aircraft during an encounter with a 5.0 nmi closest approach distance, the error covariance matrix was held fixed for each aircraft. The collision conflict probability is a function of time throughout the encounter. The collision conflict probability rate peaks at the time of closest approach. The collision conflict probability and collision conflict probability rate is a function of time for constant relative error covariance.

Avoidance maneuvering process of steps 38 through 52 are used to reduce the risk of a collision. The results of the conflict probability computation ends with a high fidelity propagated position at the time of conjunction. Keplerian two-body reverse propagation can be used to propagate backward the high fidelity propagated position to a safe position at a safe time when the subject object will be at a safe distance from the target object, and then backward in time to a current position at a current time. Hence, when it is determined 36 that a collision probability is above an acceptable threshold 34, the subject object and target object trajectories are propagated backward preferably using Keplerian two-body propagation to a current time. The use of Keplerian two-body propagation to a maneuver time of avoidance maneuvering increases the speed of computation over high fidelity trajectory propagation because Keplerian propagation has a closed form analytical solution excepting for solving Kepler's equation. The resulting state vectors includes exact two-body motion, the maneuver velocity increment, and the effects of all perturbations acting on the subject object along the non-maneuvered trajectory. The differences in the effect of orbital perturbations between the maneuvered and non-maneuvered trajectory are neglected, and therefore, the differences between the state vectors are negligible with respect to collision probability.

The high fidelity state vectors of both objects propagated to the point of conjunction are retained and used as initial condition for forward and reverse Keplerian two-body propagation for reduce computational requirements based on the recognition that the maneuvers will be small and will produce small trajectory changes. A maneuver typically displaces the position of the subject object at the conjunction point to achieve the necessary reduction in collision probability. Changes in the trajectory due to a small maneuver are typically small enough to render all higher order contributions from orbital perturbations negligible with respect to collision probability.

A maneuvering limitation determination 38 determines if a maneuver can be made in the presence of a high collision probability. For example, if the subject object is a maneuvering vehicle without any fuel, then the vehicle is limited and can not maneuver. The vehicle could have fuel, but other operational constraints may be considered by operators that may desire to conserve available fuel reserves for possible completion of a mission, even in the presence of a high collision risk. Once a collision probability is found to be above the probability threshold 34, the optimal avoidance maneuver is determined.

A maneuvering duration is selected 34 beginning at a current time and ending at the safety time when the subject vehicle will be at a safe distance from the target object, before the closet approach at conjunction. The maneuvering duration extends between the current time and the safety time, and the maneuvering duration is divided into maneuvering duration time steps, that may, for example, have time step durations equal to the approach trajectory duration time steps or the propagated trajectory time steps. The maneuvering duration can be selected using various methods, for example, a set of potential maneuver times at the maneuvering duration time steps prior to conjunction are selected. The maneuvering duration can be limited by black out periods where the subject object can not be controlled to maneuver, or during critical operational periods, such as, in the middle of a human rescue, or critical experimentation, and like criteria. The maneuvering duration preferably extends, for example, from the current time to the safety time where the subject vehicle approaches the target object to a safety distance well before the subject vehicle makes a closest approach to the target vehicle.

Once the maneuvering duration and maneuvering time steps are determined 40, the respective maneuvering directions are determined 42 using a gradient method. The gradient method uses partial derivatives of the collision probability that forms a spatial gradient with respective to the x-y-z axes directions. The partial collision probability derivatives in the x, y and z directions indicate a directional vector over the probability gradient in the direction having the largest reduction in the collision probability using the contour integration method.

After the optimum maneuver direction is found, for a given maneuver duration time step 40, the optimum magnitude is then determined for the given maneuver duration time step. Various possible magnitude values are used, and the collision probability using tie contour integration is computed for each possible magnitude. The magnitude is repetitively estimated by a numerical search and the collision probability is repetitively computed, during searching, until the smallest magnitude, that is the optimum magnitude for fuel conservation, is found where the collision probability is just below the collision threshold. A numerical search function is defined as the difference between the current estimated collision probability and the collision threshold probability. The numerical search is terminated when the search function is driven zero within a desire tolerance. Hence, the respective optimum maneuvering magnitudes are determined 42 using a root searching method.

The maneuvering directions and maneuvering magnitudes are determined 42 and 44 and can be plotted 46 if desired, for each of the maneuvering time steps 40. The maneuvering directions and respective maneuvering magnitudes are a function of the maneuvering time at respective maneuvering time steps. After computing maneuvering directions and respective maneuvering magnitudes for each of the maneuvering duration time steps, a fuel efficient maneuver can be selected 50 and then executed 52.

The maneuver direction is one that reduces the collision probability most effectively. The gradient method finds the optimal maneuver direction using trajectory propagations and collision probability calculations associated with the maneuver trajectory direction. The maneuver direction is an optimum maneuver direction. The maneuver direction is computed based on an assumed low magnitude thrust. If the magnitude is large, the direction can be recomputed, due to nonlinear gravitational affects. The gradient method examines the change in normalized partial derivatives of the collision probability along the three axis to select a direction with the maximum lowering of the collision probability. The maneuver magnitude selection preferably uses a root searching method, such as well known Newton Root and Secant Root search methods.

The maneuver magnitude is a maneuver velocity vector that most effectively lowers the collision probability to below the maneuver threshold. Hence, collision probability can be recomputed based on maneuver magnitude at the determined maneuver direction. A Secant root finding method is used to determine the optimum maneuver magnitude using trajectory propagation and collision probability associated with the new maneuver trajectory.

The maneuver time, the optimal maneuver direction, and the optimal maneuver magnitude are compiled as maneuver directions and maneuver magnitudes over the maneuver duration time steps, which can be represented in graphic form, such as a plot of maneuver velocity versus maneuver time. One of the possible maneuver times, and respective maneuver directions and maneuver magnitudes are analyzed and one is selected as the best one of the optimum maneuvers. The selection method selects one of the maneuvers from the current time. The selection method can be, for example, one selects the maneuver that uses the smallest amount of fuel to reach a collision probability equal to the predetermined probability threshold, or one that reduces the collision probability to a minimum value.

For each time, the optimum maneuver velocity direction and magnitude is found that reduces the collision probability to the maneuver threshold. This search entails propagating the state vectors backward from conjunction to the maneuver time, applying the maneuver and propagating the state vectors forward to the new conjunction time. A gradient method 42 is used to determine the direction of the most fuel-efficient maneuver. Once the direction is determined, a Secant search method is used to find the required maneuver magnitude. Other known collision avoidance methods do not determine the optimum collision avoidance maneuver. The maneuver direction $\hat{V}$ defined by a $\hat{V}$ maneuver equation, is evaluated by the relationship to the $\vec{G}$ gradient vector defined by a $\vec{G}$ gradient vector equation.

$$\hat{V} = \frac{-\vec{G}}{|\vec{G}|}$$

$$\vec{G} = \frac{\partial P}{\partial V_x}\hat{i} + \frac{\partial P}{\partial V_y}\hat{j} + \frac{\partial P}{\partial V_z}\hat{k}$$

In the $\vec{G}$ gradient vector equation, the terms x, y, z are velocity components and are defined in the local coordinate frame, with z being opposite to the radial vector, y being opposite to the angular momentum vector and x completing the right handed system. The size of the velocity increments used in evaluating the gradient can be adjusted for the nature of the problem being solved. A velocity increment of approximately one cm/sec was found acceptable for several cases involving geostationary satellites. The magnitude of the maneuver velocity 44 is found using the Secant root finding scheme with velocity increments directed along the previously defined maneuver velocity direction 42 given by the maneuver direction equation and gradient vector equation. The solution is obtained when the function, F(v), is zero 44 to within a prescribed tolerance $\epsilon$ in a F(v) function equation $F(v)=P_M-P_T\leqq\epsilon$. In the F(v) function equation, the term $P_M$ is the collision probability or the cumulative collision probability associated with the maneuver velocity magnitude v 46, and $P_T$ is the collision probability maneuver threshold. The maneuver velocity magnitude is saved with an associated application time 46. The same procedure is used for other maneuver application times.

Figure 4:
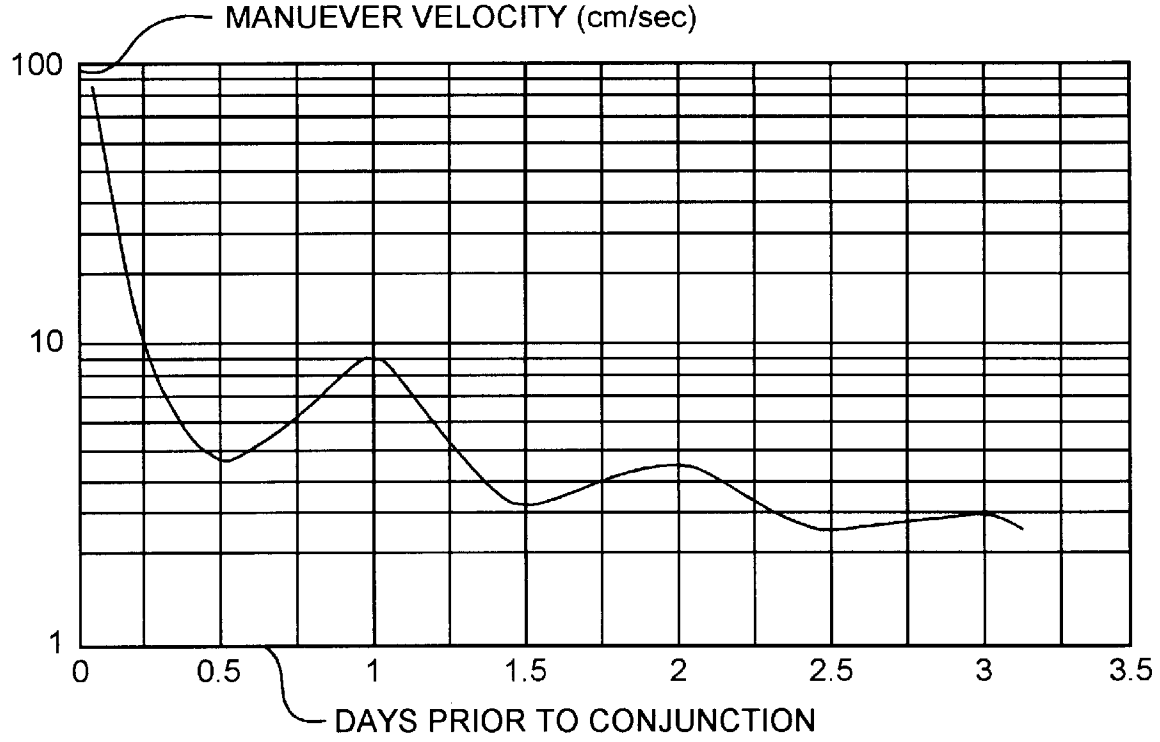
FIG. 4 is a maneuver velocity magnitude graph.

Satellite operational constraints can limit the maneuver direction. In such cases, the gradient is modified appropriately and the maneuver velocity magnitude is found in the same way. FIG. 4 illustrates a case where the maneuver velocity is limited to posigrade or retrograde velocity increments. The magnitude of maneuver velocity is plotted as a function of time prior to the original conjunction. When compared to the magnitude of the maneuver velocity for a fully three-dimensional maneuver significant differences exist when the maneuver is applied close to the time of conjunction. The maneuver direction is initially in the forward or reverse direction when the maneuver time is far from conjunction. As the maneuver time approaches conjunction, the three-dimensional maneuver direction changes into a direction having a progressively larger nadir component. A satellite operator can select the maneuver time 50 and associated velocity from the plot of maneuver velocity magnitude versus time prior to conjunction. In some cases, the maneuver can be incorporated into routine station-keeping maneuvers.

The selected maneuver that reduces the risk of a space vehicle colliding with another space object was developed.

For a specified time prior to conjunction, a maneuver is found that will reduce the collision probability or the cumulative collision probability, to below a predefined probability threshold 36. In this manner, the maneuver magnitude and space vehicle propellant required can be minimized, thereby extending space vehicle life. The method provides great computational efficiencies in orbital propagation, collision probability prediction, and maneuver optimization. Maneuver optimization is streamlined by recognizing that the associated displacement at conjunction is a linear function of maneuver magnitude. This enables the maneuver direction 42 to be determined separately from maneuver magnitude 44. Thus, the dimensionality of the maneuver optimization is reduced from three-dimensions to one-dimension for efficient computation.

The most fuel-efficient maneuver is selected so as to reduce the collision probability below a prescribed threshold 36 for each maneuver time being considered. This method determines the optimal maneuver to reduce the cumulative collision probability. The cumulative collision probability is the sum of collision probability of one or more potential collisions involving the maneuvering vehicle.

Figure 3:
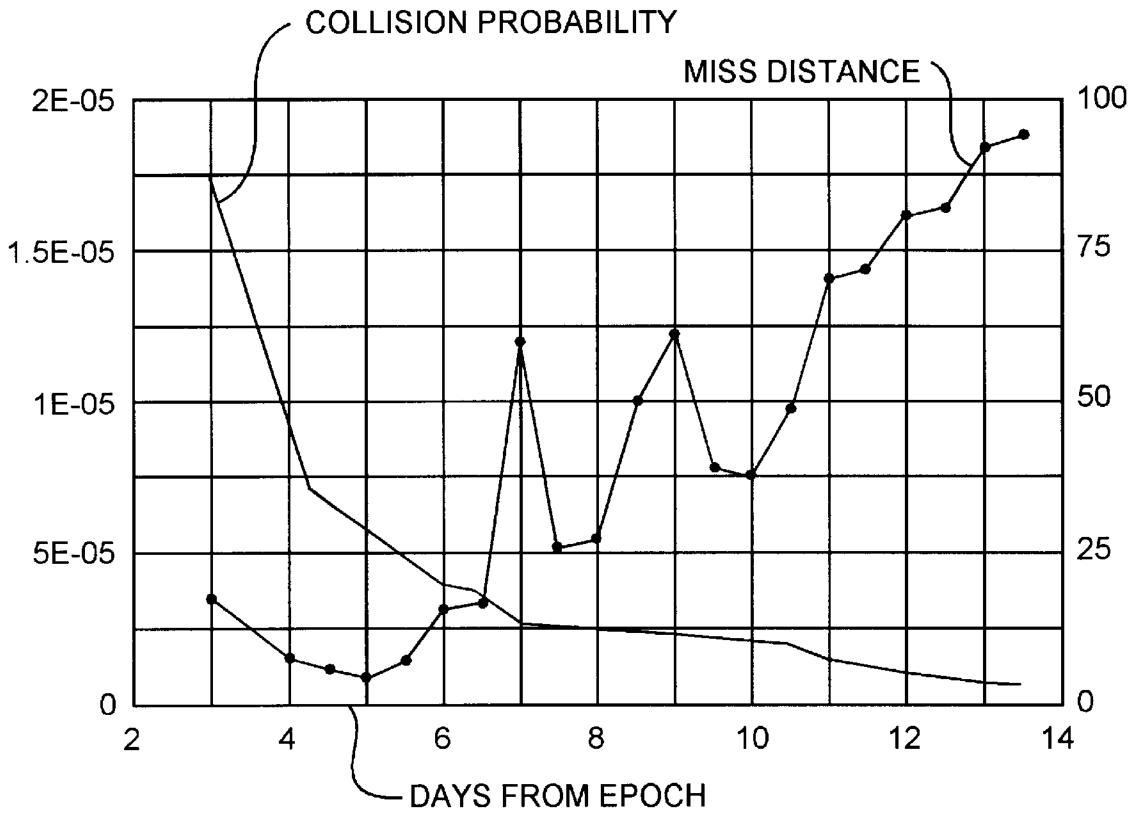
FIG. 3 is a probability and miss distance graph.

Referring to FIG. 3, the probability for each of several identified conjunctions between the two vehicles is computed. For this case, there were no conjunctions between the subject object and any other object except the target object. The run length was 14 days and there were no conjunctions prior to 3 days. The cumulative probability of collision was $7.74e^{-5}$. The individual conjunction probabilities exhibit a general decrease in risk as time increases from epoch. As time progresses, the two covariances will grow and the probability density becomes less thereby resulting in naturally lower probabilities. FIG. 3 also shows the nominal miss distance history for the same two vehicles. The miss distance does not exhibit the smooth behavior as does the probability curve. At times, the miss distance oscillates while the probability showed a steady decrease. Consider the first few conjunctions from FIG. 3. The first conjunction at 3.04 days had the highest probability with a miss distance of approximately 17.0 km. The next few conjunctions had noticeably lower probabilities although the miss distance actually decreased to less than 7.0 km. The miss distance is based upon the separation of the nominal trajectories while the probability computations are based on separation distance and relative error covariance projected to the encounter plane. Therefore, differences in specific encounter geometry that does not alter miss distance can significantly change the collision probability. Consequently, there is not a direct one-to-one correlation between the probability of collision and the nominal miss distance for the two objects. This is an important point when conducting collision risk assessments. A small miss distance does not necessarily translate into a high probability of collision. Conversely, high probability can be achieved even though the nominal miss distance is large. Simply examining the miss distance between two objects does not generate a clear understanding as to the true measure of collision risk. The optimum maneuver velocity magnitude varies with the maneuver time as illustrated in FIG. 4. The cyclic variation is the same as the orbital period, such as one day. In general, the earlier the maneuver is made prior to conjunction, the less maneuver velocity is required, and hence the less thrust and less fuel consumed.

Figure 5A:
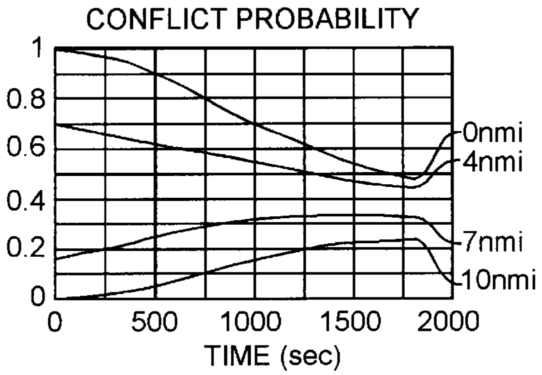
FIG. 5A is a level flight conflict probability graph.
Figure 5B:
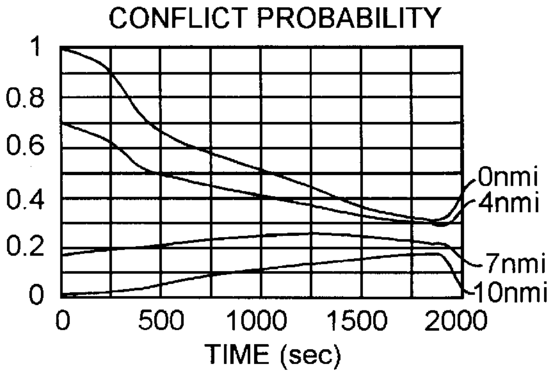
FIG. 5B is a descending flight conflict probability graph.

Referring to FIGS. 5A and 5B, collision conflict probability depends on the amount of time between aircraft state vector update and the time of closest approach because the position error covariance grows linearly in the in-track direction. FIG. 5A shows collision conflict probability corresponding to the target aircraft shown in FIG. 5B descending at 1,500 ft per minute. FIGS. 5A and 5B illustrate the collision conflict probability as a function of time to the closest approach for several closest approach distances. Only the z-axis error covariances of the error covariance matrices increased, because level flight was assumed for these cases for the subject aircraft. The increase in probability for the larger closest approach distances reflects the significant growth in the relative position error. Aircraft descent affects collision conflict probability. For example, during a descent of 1,500 ft per minute, the one-sigma z-axis position error increases at a rate of 0.333 nmi per minute. The one-sigma y-axis position error increases at 300 feet per minute. The target aircraft began descending seven minutes before closest approach until seven minutes after closest approach. The initial altitude of the target aircraft is adjusted so that the vertical separation from the subject aircraft is zero at closest approach. The collision conflict probability is found for state vector updates at various times for several closest approach distances. The effect of increasing relative position error is due to the aircraft descent.

Figure 6A:
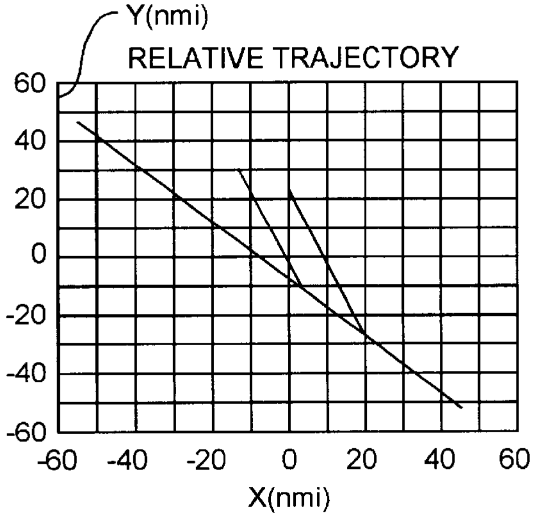
FIG. 6A is an aircraft relative trajectory graph.
Figure 6B:
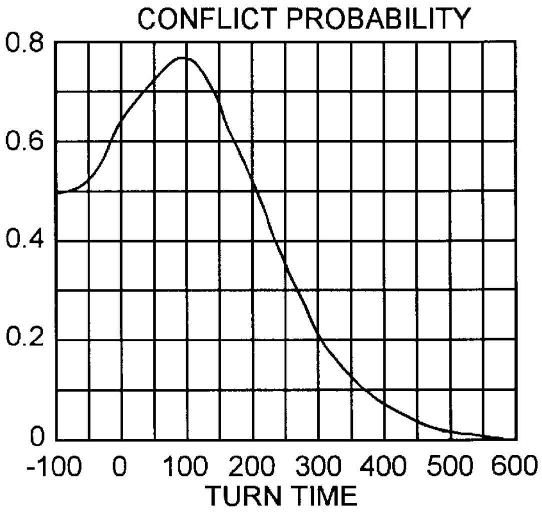
FIG. 6B is an aircraft probability graph.

Referring to FIGS. 6A and 6B, the method predicts collision conflict probability for aircraft turns at waypoints as well as ascent and descent flight conditions and level flights. An aircraft turn affects the collision conflict probability by changing the relative velocity and encounter frame. The target aircraft makes a turn, with each aircraft having a speed of 360 knots. The one-sigma z-axis position error starts at 0.25 nmi and grows linearly at a rate of 0.25 nmi per minute. The one-sigma x-axis position error is assumed fixed at 2.0 nmi. The one-sigma y-axis errors are fixed at 100 feet. The target aircraft has the state vectors updated at initiation of the encounter and executes an instantaneous 45 degree right turn at a specified time prior to closest approach, which occurs at 600 seconds. FIG. 6A illustrates the relative trajectory with turns at 95 and 300 seconds from closest approach. The closest approach distance is zero for the turn executed at 95 seconds. Each trajectory represents 1200 seconds. The turn trajectories appear truncated because the relative velocity magnitude decreases due to the turn. FIG. 6B illustrates the collision conflict probability as a function of turn time. The maximum probability occurs at 95 seconds, which also corresponds to the minimum closest approach distance.

Operational maneuver planning can be complicated by the avoidance maneuver. For instance, consider a vehicle that is facing several conjunctions, but only one of which is dangerous and warrants a maneuver. Then, once a maneuver solution is found that reduces that conjunction to a safe level, care must be taken to make sure the final burn solution does not significantly increase the collision risk with any other conjunctions. Some operational considerations enter the decision-making process regarding the selection of the actual burn to be performed. In general, it is better to conduct probability reduction maneuvers in terms of fuel efficiency as far in advance of the dangerous conjunctions as possible. However, state vector information is constantly updated and the target object, if it is an active vehicle, may undergo its own stationkeeping or operational maneuvers that will invalidate an early burn solution. Therefore, it may be at times advisable to wait until the conjunction is imminent before conducting a burn for the subject object.

A maneuver is selected that will reduce the risk of a space vehicle colliding with another space object. For a specified time prior to conjunction, a maneuver is found that will reduce the collision probability to a predefined maneuver threshold. In this manner, the maneuver magnitude and space vehicle propellant required can be minimized, thereby extending space vehicle life. The method provides computational efficiencies in orbital propagation, collision probability prediction, and maneuver optimization. Those skilled in the art can make enhancements, improvements, and modifications to the invention, and these enhancements, improvements, and modifications may nonetheless fall within the spirit and scope of the following claims.

What is claimed is:

1. A method for maneuvering a subject object for collision avoidance with a target object that may have a risk of collision at an approach time, the method comprising the steps of, propagating backward trajectories of the subject object and the target object backward in time from the approach time, direction determining a maneuver direction of the subject object using a x-y-z conflict probability gradient of a conflict probability function where x-y-z directional partial derivatives of the x-y-z conflict probability gradient provide x-y-z directional decreases in a conflict probability for indicating the maneuver direction, and magnitude searching over maneuver magnitude values for an optimum maneuver magnitude by computing the conflict probability in the maneuver direction for each of the maneuver magnitude values and selecting one of the magnitude values as an optimum maneuver magnitude.

2. The method of claim 1 wherein the subject object is a maneuverable object, and wherein the searching step, the optimum maneuver magnitude requires a least amount of fuel consumption by the subject object to reduce the conflict probability to a predetermined threshold.

3. The method of claim 1 wherein the backward propagated trajectories are Keplerian two-body propagated trajectories.

4. The method of claim 1 wherein the propagated backward trajectories are backward propagated over a maneuvering duration divided into maneuvering duration time steps, and the direction determining and magnitude searching steps are executed for each of the maneuvering duration time steps for providing respective maneuver directions and optimum maneuver magnitudes.

5. The method of claim 1 wherein the subject object is a maneuverable object, and wherein the propagated backward trajectories are backward propagated over a maneuvering duration divided into maneuvering duration time steps, and the direction determining and magnitude searching steps are executed for each of the maneuvering duration time steps for providing respective maneuver directions and optimum maneuver magnitudes, the method further comprising the step of, maneuvering the subject object at one of the respective optimum maneuver directions and optimum maneuver magnitudes for avoiding collision with the target object.

6. The method of claim 1 wherein the subject object is a maneuverable object, the method further comprising the steps of, determining a maneuvering duration extending between a current time at current positions of the subject object and the target object, the maneuvering duration extending between the current time and a safety time when subject object approaches the target object to a safety distance, the propagated backward trajectories being backward propagated over the maneuvering duration divided into maneuvering duration time steps, the direction determining and magnitude searching steps being executed for each of the maneuvering duration time steps for providing respective maneuver directions and respective optimum maneuver magnitudes, and maneuvering the subject object at one of the respective maneuver directions and at one of the respective optimum maneuver magnitudes for avoiding collision with the target object.

7. The method of claim 1 wherein the direction determining step comprises the steps of, applying a nominal magnitude along an x-axis and computing an x directional partial reduction in the collision probability, applying a nominal magnitude along a y-axis and computing a y directional partial reduction in the collision probability, applying a nominal magnitude along a z-axis and computing a z directional partial reduction in the collision probability, and combining the x directional partial reduction and the y directional partial reduction and the z directional partial reduction into an x-y-z directional vector as the maneuvering direction.

8. The method of claim 1 wherein magnitude searching step searches the maneuver magnitude values for the optimum maneuver magnitude when the computed collision probability for a maneuver magnitude value is equal to a predetermined collision probability threshold.

9. A method for maneuvering a subject object for collision avoidance with a target object that may have a risk of collision at an approach time, the method comprising the steps of, propagating backward trajectories of the subject object and the target object backward in time from the approach time, and direction determining a maneuver direction of the subject object using a x-y-z conflict probability gradient of a conflict probability function where x-y-z directional partial derivatives of the x-y-z conflict probability gradient provide x-y-z directional decreases in a conflict probability for indicating the maneuver direction.

* * * * *

UNITED STATES PATENT AND TRADEMARK OFFICE

CERTIFICATE OF CORRECTION

PATENT NO. : 6,691,034 B1 
DATED : February 10, 2004
INVENTOR(S) : Russell Paul Patera and Glenn Earl Peterson It is certified that error appears in the above-identified patent and that said Letters Patent is hereby corrected as shown below:

Drawings,
Caption of FIG. 6B "PROBABIOITY" should be -- PROBABILITY --

Column 10,
Line 67, "symetric" should be -- symmetric --

Column 13,
Mathematical Nomenclature Table, the definition for U, "WSPQ" should be -- WSQP --

Column 14,
3rd Equation, "$S^{-1}$" should be -- $S^{T}$ --

Column 19,
Line 8, "tie" should be -- the --

Signed and Sealed this

Thirty-first Day of August, 2004

JON W. DUDAS
*Director of the United States Patent and Trademark Office*